United States Patent [19]
Ohta

[11] 3,899,217
[45] Aug. 12, 1975

[54] HYDRAULIC BRAKE PRESSURE CONTROL VALVE UNIT

[75] Inventor: Yoshimoto Ohta, Kawasaki, Japan

[73] Assignee: Tokico Limited, Japan

[22] Filed: Oct. 9, 1973

[21] Appl. No.: 404,740

[30] Foreign Application Priority Data
Oct. 9, 1972 Japan.............................. 47-101286
July 6, 1973 Japan............................... 48-76337

[52] U.S. Cl. ............................... 303/24 C; 303/6 C
[51] Int. Cl. .............................................. B60t 8/14
[58] Field of Search ...... 303/6 C, 24 R, 24 A, 24 C, 303/24 F, 61

[56] References Cited
UNITED STATES PATENTS
3,163,473  12/1964  Stelzer........................... 303/24 F X
3,455,609  7/1969  Bratten ............................ 303/24 C FOREIGN PATENTS OR APPLICATIONS
1,183,199  3/1970  United Kingdom............... 303/24 C

*Primary Examiner*—Duane A. Reger
*Attorney, Agent, or Firm*—Holman & Stern

[57] ABSTRACT

A hydraulic pressure control valve assembly for insertion in the hydraulic brake system of an automotive vehicle is disclosed. The valve assembly includes a liquid flow passage and a control chamber located within the main valve housing, and a movable separating wall fitted within the control chamber. First and second spring means operate in conjunction with the separating wall, a piston and an inertia valve to provide a control valve in which the characteristic performance can be easily modified in a variety of ways.

4 Claims, 6 Drawing Figures

HYDRAULIC BRAKE PRESSURE CONTROL VALVE UNIT

This invention relates to a hydraulic pressure control valve assembly to be inserted in the hydraulic brake system of a powered vehicle having front and rear wheels.

In such hydraulic vehicle braking system, if the driver actuates the brake pedal for applying the braking hydraulic pressure equally to all the vehicle wheels, the rear wheels are more likely to be subjected to locking, thereby giving rise to dangerous skidding.

It is general practice for avoiding such dangerous rear wheel lock to provide a hydraulic brake pressure control valve assembly in the brake pipe means extending from the master cylinder operatively connected with the brake pedal and the rear wheel brake cylinders, or briefly rear wheel cylinders, so as to apply lesser braking effort to the rear wheel than the front wheels.

There are two general types in these brake pressure control valve units for automotive rear wheels. The first type is so designed that the vehicle load is sensed and the hydraulic brake pressure is controlled as responsive to such sensed vehicle load. In the second type, vehicle deceleration degree is sensed during brake application and the hydraulic brake pressure is controlled in response to the thus sensed values. The invention relates to an improvement in and relating to the latter general type of hydraulic brake pressure control valve units.

In the conventional brake pressure control valve assembly of the second type above referred to, an inertia valve actuable by sensing the vehicle deceleration degree during the brake application period is used and it is so arranged that this inertia valve interrupts directly the braking hydraulic liquid passage. In this kind of arrangement, it has been encountered that the characteristic range is of very small range, say in a so-to-speak fixed manner.

It is, therefore, a main object of the present invention to provide an improved hydraulic pressure control valve unit the characteristic performance of which can be easily modified in the design stage of the unit in easy and several different ways.

In the present invention, the inertia valve does not interrupt directly the liquid flow through the said liquid flow passage in the control valve unit and there is provided a separate valve member adapted for execution of such direct liquid flow interruption, while the inertia valve is so arranged that it acts as a pressure control means for modifying the load of spring means acting characteristically upon the said separate valve means for flow interruption through the said flow passage.

This and further objects, features and advantages of the present invention will become more apparent from the following detailed description of the invention, taken by reference to the accompanying drawings illustrative of several preferred embodiments of the invention.

In the following, several preferred embodiments will be described by reference to the accompanying drawings.

Figure 1:
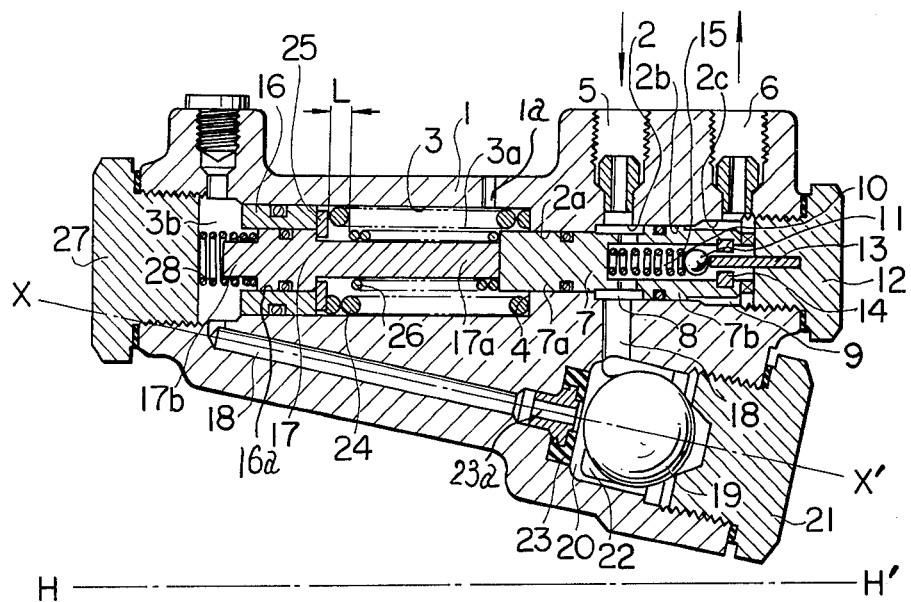
FIG. 1 is a longitudinal section of the first embodiment of the invention.

In FIG. 1, numeral 1 represents a valve housing which is formed with a longitudinal bore 2 comprising a small diameter inner portion 2a, a middle diameter portion 2b and a large diameter outer portion 2c. The valve housing 1 and further with a control chamber 3 in the form of an extension of the first bore portion 2a, being defined therefrom by a ring shoulder 4.

The housing 1 is formed with an inlet port 5 and an outlet port 6 hydraulically communicating with the middle and large bore portions 2b and 2c, respectively.

Numeral 7 represents a stepped piston having a small diameter portion 7a and a large diameter portion 7b slidable in bore portions 2a and 2b, respectively. By the provision of this stepped piston 7, a first ring space chamber 8 and a second ring space chamber 9 are formed within the bore 2 and kept in fluid communication with inlet port 5 and outlet port 6, respectively, In the material of the stepped piston 7, a valved communication passage 10 is provided which is adapted for communication with the inlet and outlet ports 5 and 6, through said first and second ring space chambers 8 and 9, respectively, In the passage 10, a valve seat 14 is provided which is a stationary ring made of a metal or rubber, the later being rather preferable.

The valve seat 14 is adapted for cooperation with a valve member 11, preferably formed into a ball as shown, which is urged by a valve spring contained in the passage 10 towards its closing position, yet normally kept as its off-seat position by a push rod 13 extending from a closure plug 12 screwed into the right-hand tapped open end of the bore 2, axially through the central opening of the ring valve seat 14. Normally, the piston 7 is kept at its right-hand extreme position shown in FIG. 1, as will be more fully described hereinafter, so as to keep the passage 10 freely communicating with the both ports 5 and 6, as referred to above. As will be easily understood from the foregoing description, when the piston 7 is moved leftwards from its position shown in FIG. 1, the valve member 11 is brought into its closed position relative to valve seat 14 under the influence of the spring action at 15. In this case, the hydraulic communication between the ports 5 and 6 through the passage 10 is interrupted by the closed valve member 11.

The inlet port 5 is hydraulically connected with a hydraulic pressure source, preferably a conventional master cylinder through a first connecting piping, although not specifically shown. In a similar way, the outlet port 6 is connected through a further or second connecting piping to one of the rear wheel brake cylinder, although not specifically shown.

In this way, the master cylinder, the first connecting piping, said inlet port 5, first ring chamber 8, said passage 10, second ring chamber 9, outlet port 6, the second connecting piping and the rear wheel cylinder constitute in combination a hydraulic braking system for the rear wheel of an automotive vehicle, not shown. This hydraulic brake system constitutes an inlet side having several parts upstream of the valve member 11 and an outlet side having several parts downstream of the latter, when seen relative to the control valve assembly.

Numeral 16 represents a separating wall member which may be formed into a centrally perforated free piston, a resilient sealing ring or the like. In the present embodiment, the separating wall member 16 is formed into the free piston arranged within the control chamber 3 to be sealingly shiftable in the axial direction thereof. A stepped plunger 17 comprises a smaller diameter portion 17a and a larger diameter portion 17b which is coupled with the member 16 so as to be sealingly shiftable relative to the central bore 16a of the wall member 16. By this arrangement, the control chamber 3 is divided into two or more spaces, precisely an inner space 3a and an outer space 3b which is closed at its outer periphery by a second screw plug 27 threaded into the tapped left-hand end part of the outer control chamber portion 3b. The inner control chamber portion 3a communicates with the open atmosphere through a lateral port 1a formed through the wall of valve housing 1. The small diameter portion 17a has enough length so as to abut normally at its inner end against the small diameter portion 7a of the stepped piston 7 under the action of a back-up spring 28 inserted between second plug 27 and the larger diameter portion 17b of stepped plunger 17.

Within the material of valve housing 1, there is provided an inclined passage 18 the outer end thereof being opened at the left-side or outer control chamber portion 3b. The opposite end of this inclined passage 18 is kept normally in fluid communication through a centrally perforated valve seat assembly 23 with the interior space of a large valve chamber 20 of the inclined arrangement and formed within the valve housing 1, said valve chamber being kept in communication through a connection passage 18 with the first ring chamber 8, and thus inlet port 5.

Within the valve chamber 20, there is provided an inertia valve member 19, preferably formed into a ball valve as shown, which is normally kept at its open position separated from said valve seat assembly 23. When the automotive vehicle is subjected to a certain degree of deceleration, the inertia valve 19 is brought automatically to its valve closing position relative to the seat assembly. By mounting the valve housing 1 so as to have the axial direction of the inclined passage 18 a larger inclined angle with the horizontal plane shown at H - H', the critical degree of vehicle deceleration can be increased, and vice versa.

The outer side of the valve chamber 20 is tapped, so as to receive a screwed plug 21 for closure thereof as shown. By advancing or receding the screwed plug from position, the critical vehicle deceleration degree can naturally be adjusted as desired. Numeral 22 represents only schematically a guide surface for allowing the inertia valve member 19 to execute the passage closure or opening operation. Under normal conditions, when the wheel is applied with braking force, the inertia valve 19 is brought to its fluid flow interruption position through the passage 18 and seat assembly 23.

A first spring 24 is arranged in the inner control chamber portion 3a and inserted substantially with its free length between the shoulder 4 and a spring mount 25 which abuts commonly on the inner end surfaces of separating wall member 16 and large diameter plunger portion 17b. By application of a hydraulic pressure to the outer control chamber portion 3b, thereby the separating wall member 16 being shifted rightwards in FIG. 1, the first spring 24 is subjected to compression from beginning of the hydraulic pressure application by the movement of the member 16.

Numeral 26 represents a second spring provided within the chamber portion 3a and positioned in its free static around the small plunger portion 17a and with its outer free end kept at a certain predetermined length "L" measured longitudinally from the inner end surface of spring mount 25. Therefore, upon application of hydraulic pressure to the control chamber portion 3b, so as to move the separating wall member 16 rightwards as before, the second spring 26 abutting with its inner end against the inner free surface of the inner and smaller piston portion 7a, will be subjected to compression only after rightward travel of the movable wall member 16 through the separating idle distance L.

Back-up spring 28 is only of a weak strength, serving during off-service period or initial braking period of the wheel braking system, to hold the combination of the piston 7 and plunger 17 at its extreme right-hand position shown in FIG. 1 and providing practically no influence of the characteristics of the control valve assembly as a whole.

The operation of the first embodiment of the inventive control valve assembly so far as shown and described is as follows.

It should be noted at first that the control assembly is so mounted on the vehicle chassis, not shown, that it is positioned to direct the left-hand end of the assembly in the forward direction of the vehicle. Therefore, before an application of hydraulic braking to the related rear wheel, the inertia valve member 19 abuts in its open state on the related plug 21 and the spring-loaded control valve member 11 is also kept at its open state, as was referred to hereinbefore.

Under these conditions, when the vehicle driver depresses the brake pedal, not shown, coupled with the master cylinder, for initiation of wheel braking, hydraulic pressure will be supplied from the master cylinder through the first connecting piping, not shown, the inlet port 5, first ring chamber 8, passage 10, second ring chamber 9, outlet port 6 and second connecting piping, not shown, to the related rear wheel cylinder or cylinders, again not shown, thus a corresponding braking pressure being applied thereto.

On account of the inertia valve member 19 positioned at its open state, pressure liquid will be allowed to flow from the first ring chamber 8, connection passage 18, valve chamber 20, central bore 23a of valve seat assembly 23 into the inclined passage 18, thence further into the outer control chamber portion 3b, while the inner control chamber portion 3a is kept at atmospheric pressure. By the development of a substantial pressure difference thus caused across the movable separating wall member 16, the latter is caused to move rightwards in FIG. 1, and therefore, the first spring 24 is subjected to a gradually increasing compression, as was mentioned hereinbefore only briefly. The thus increasing spring force is received at the ring shoulder 4 formed in the valve housing 1.

Piston 7 is urged to move leftwards in FIG. 1 under the influence of the pressure differential between the pressures prevailing in the second ring chamber 9 and the first control chamber portion 3a, but it is normally balanced by the abutting pressure exerted by the plunger 17 which is subjected to the pressure prevailing in the second control chamber portion 3b. When the latter pressure exceeds or equals the former urging pressure, the piston 7 is kept in the position shown in FIG. 1.

At the initial stage of the braking operation and even when the movable separating wall means 16 is moved rightwards as mentioned hereinbefore, the second spring 26 will not be subjected to compression.

With further increased breaking pressure for applying more effective brake pressure to the related wheel or wheels, and thus, when the deceleration degree of the vehicle exceeds a predetermined value, inertia valve 19 will be caused to roll up along the rolling surface 22 by the inertia owned by the valve until it is brought into engagement with its mating seat 23 so that the oil passage route 18 is closed. Upon establishment of such valve closed conditions, the hydraulic liquid pressure supplied at this period is sealed in the second control chamber portion 3b.

With further increased hydraulic braking pressure supplied from the master cylinder, the hydraulic urging force applied to the piston 7 will be increased correspondingly so that the latter is moved leftwards in FIG. 1, thereby the second spring 26 being subjected to compression upon its abutment by its free end against spring mount 25.

At the same time, the separating wall means 16 is moved rightwards in FIG. 1 so that the first spring 24 is further correspondingly compressed. With this displacement of piston 7, valve member 11 will be caused to be released from contact with the tip end of push rod 13 and brought into contact with valve seat 14, thereby the liquid passage 10 being interrupted.

With increase of the hydraulic liquid pressure in the liquid inlet side of the control valve assembly, the rightwardly urging force acting upon the piston 7 in the chamber 8 will become larger than the oppositely acting force, thereby the piston being shifted reversedly in the rightward direction in FIG. 1. By this reverse movement of the piston, valve member 11 is acted on again by the free end of push rod 13, so as to open the passage route 10 to redeliver hydraulic brake pressure towards the related rear wheel or wheels through outlet port 6. With increased liquid pressure prevailing in the brake cylinder side, the piston 7 will be caused again to shift leftwards in FIG. 1, so as to close the liquid passage 10 again by the valve member 11.

The above kind of on-off control operation of the liquid passage route in the control valve assembly will be continuously repeated, so long as the increase of the liquid inlet pressure continues.

In the following, the aforementioned hydraulic pressure control operation of the inventive control valve assembly will be more specifically described by reference to FIG. 2 which illustrates a characteristic chart of rear wheel cylinder pressure plotted against master cylinder pressure.

In this chart, line O - A represents such a characteristic in advance of the first liquid flow interruption at liquid passage route 10.

Upon occurrence of the said first flow interruption at the liquid passage route 10 by closure of the control valve member 11 in the piston 7, a braking characteristic as a whole will be realized along a rather reducedly rising curve A - B, the reducing rate or slope being determined by the ratio of small diameter at 7a to middle diameter at 7b of the stepped piston. At an intermediate point P, the cut-off pressure for the control chamber portion 3b by actuation of inertia valve 19 can be derived. On the characteristic chart specifically shown in FIG. 2, it will be seen that the characteristic of the hydraulic braking system embodying the pressure control valve unit according to the present invention will progress along the line P - A consisting a part of the line O - A upon the closure of inertia valve 19 till the closure of control valve member 11.

In fact, with change of the load including that of the vehicle chassis by the chassis suspension spring means, the braking hydraulic pressure necessary for attainment of the predetermined vehicle deceleration degree will be subjected to change correspondingly. Or more specifically, the hydraulic pressure sealed in the control chamber portion 3b by closure of inertia valve 19 will become correspondingly higher with increase of the said overall load carried by the suspension spring means and thus, the hydraulic pressure necessary for initiation of the operation of the piston 7 will become larger with increase of the overall load above referred to. When, therefore, the line O - A - B be assumed to be the characteristic curve for an empty or non-loaded automotive vehicle, it will change along a certain higher level curve, for instance O - A' - B' when the vehicle is substantially loaded. In this loaded case, the cut-off pressure for the chamber portion 3b by the inertia valve 19 will be shifted upwards along the line O - A - A' from the former point P to a new point P'.

It will be seen from the foregoing that the line portion P - A or P' - A' represents the characteristic appearing upon interruption of the liquid passage route in the control valve unit by inertial valve 19 to the inwardly sliding movement of piston 7 for closure of the passage by actuation of the valve member 11. This operational stroke is carried out with compressive deformation of the first spring 24.

Therefore, it will be seen from the foregoing that even if the inertia valve 19 will close at a predetermined vehicle deceleration degree and the sealed-in hydraulic pressure in the chamber portion 3b is the correctly required value corresponding to such vehicle deceleration degree, the spring force at 24 can be modified by alteration of the effective pressure-receiving cross-sectional area of the movable separating wall means 16 which takes over the compression of said spring 24 under the influence of said sealed-in hydraulic pressure.

Or more specifically, by adopting a smaller pressure-receiving effective cross-sectional area of the separating wall means 16, the distance P - A or P' - A' will become shortened correspondingly. On the contrary, when the cross-sectional area be selected to a larger value, the said distance will become correspondingly larger. Thus, by selecting the effective cross-sectional area of the member 16 to a proper value beforehand, the characteristic curves O - A - B and O - A' - B' to be realized at the empty or non-loaded and full-loaded conditions of the automotive vehicle can be set as nearly as possible to the ideal characteristic curve.

Figure 2:
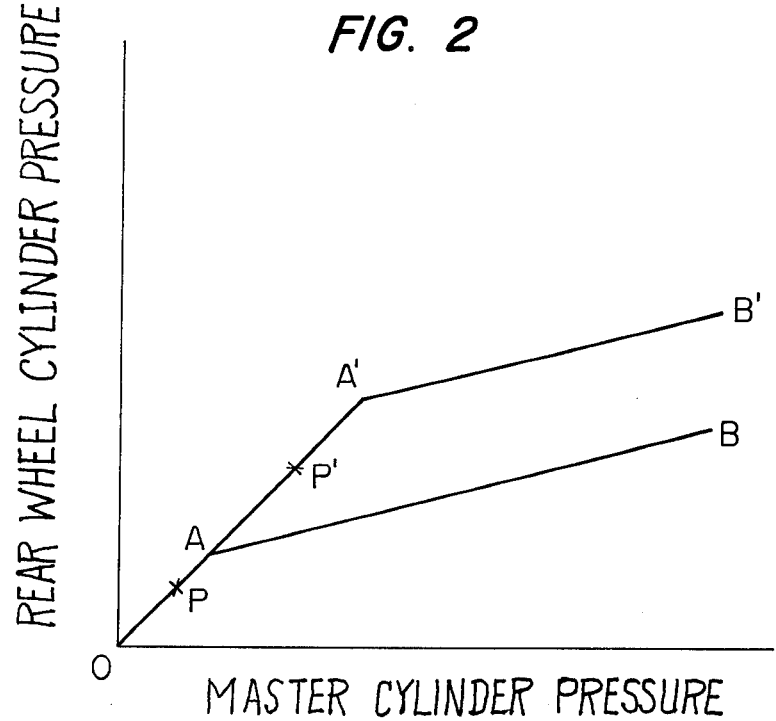
FIG. 2 is a characteristic chart of the hydraulic rear wheel braking system provided with the said first embodiment of the invention, being illustrative of rear wheel cylinder pressure plotted against master cylinder pressure.
Figure 3:
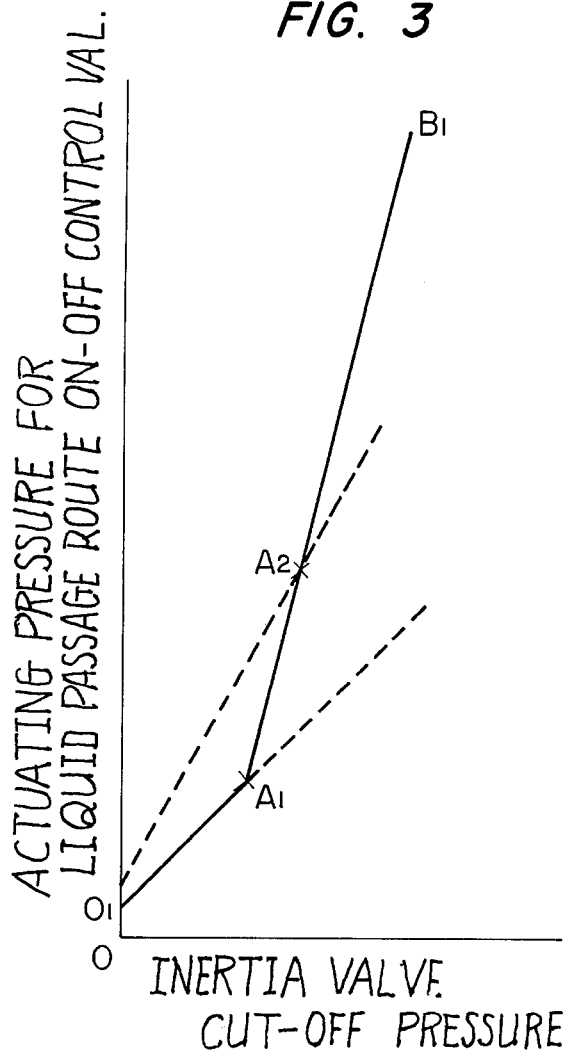
FIG. 3 is a further characteristic chart of actuating pressure for liquid passage on-off control valve plotted against cut-off pressure for inertia valve.

When reference be had to FIG. 2, the line $O_1 - A_1$ represents the characteristic which can be realized in advance of the initiation of the second spring 26, while that realizable upon the initiation of spring compression at 26 is shown by a rather abruptly steep line $A_1 - B_1$.

The ideal operation characteristic as expressed by the liquid passage route on-off control valve operation pressure plotted against inertia valve cut-off pressure will be determined the vehicle specification and it must satisfy simultaneously a relatively lower point $A_1$ for the empty or non-loaded condition and a relatively higher point $A_2$ for full-loaded condition of the vehicle. It should be noted further that the extension of the line defined by these two points $A_1$ and $A_2$ must not pass the origin O. From this requirement, comparative conventional pressure control valve must have a certain characteristic which includes either the lower point $A_1$ for non-loaded vehicle or the higher point $A_2$ for full-loaded vehicle.

In sharp contrast thereto and in the case of the present invention, the characteristic curve takes the form of the curve $O_1 - A_1 - B_1$ and thus, ideally required characteristic can be realized by selecting the spring constance at 26, the distance L and the effective diameter of the separating wall means 16.

Figure 4:
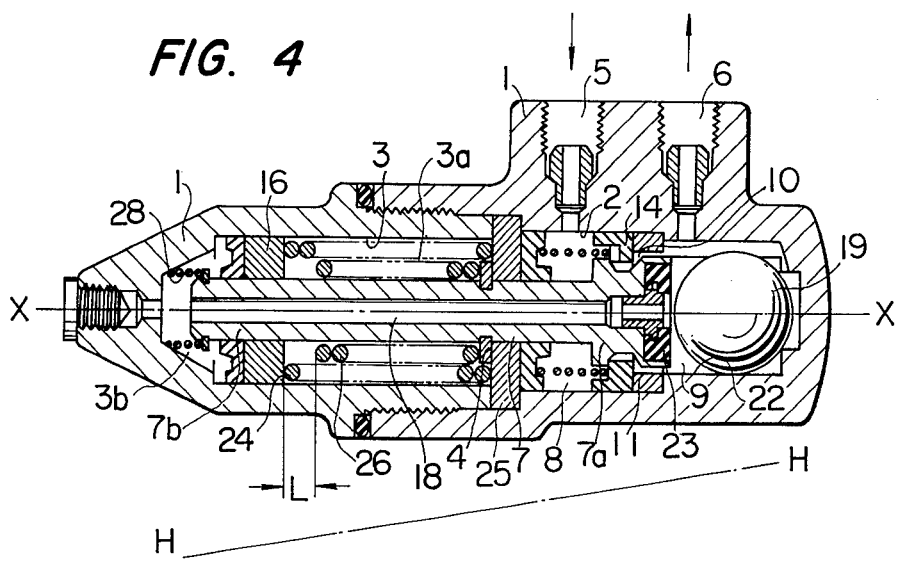
FIG. 4 is a similar view to FIG. 1, illustrative of a slight modification from the first embodiment.

In FIG. 4, a modification from the foregoing first embodiment is shown in its longitudinal section, as in the case of FIG. 1. In this modification, same or similar constituent parts are shown by respective same reference numeral irrespective of their minor configurational differences if any.

A first difference of the present modification from the foreging resides in that the valve member 11 adapted for on-off control of the liquid passage route in the control valve unit is formed on the large diameter portion 7a of the stepped piston 7 and the smaller diameter portion 7b of the latter is so extended as to include the plunger employed in the first embodiment, for slidingly cooperating the separating wall means 16 formed in a movable sealing ring. The second difference resides in that the liquid guide passage 18 adapted for guiding the liquid to the second control chamber 3b is provided in the presently modified stepped piston 7, in place of the material of the valve housing 1.

The third difference resides in that part of the liquid passage route provided within the interior of the pressure control valve unit, being denoted 9, has been designed as the valve chamber for containing therein the inertia valve 19.

Further, the passage 10 adapted for establishing the liquid passage between the chambers 8 and 9 has been formed between the wall of the bore 2 and the piston 7. In addition, the spring mount 25 has been arranged at the opposite or inner ends of the first and second springs 24; 26 and slidingly guides the small diameter portion 7b of the piston 7.

By adopting the above modified design, the pressure control valve unit has been minimized in its overall dimensions in comparison with those of the first embodiment. The manufacture can be carried out more easily than before.

The operation of the present modification is substantially the same as before so that it can be easily understood without disclosing further analysis, from consultation with the foregoing description of the first embodiment.

Figure 5:
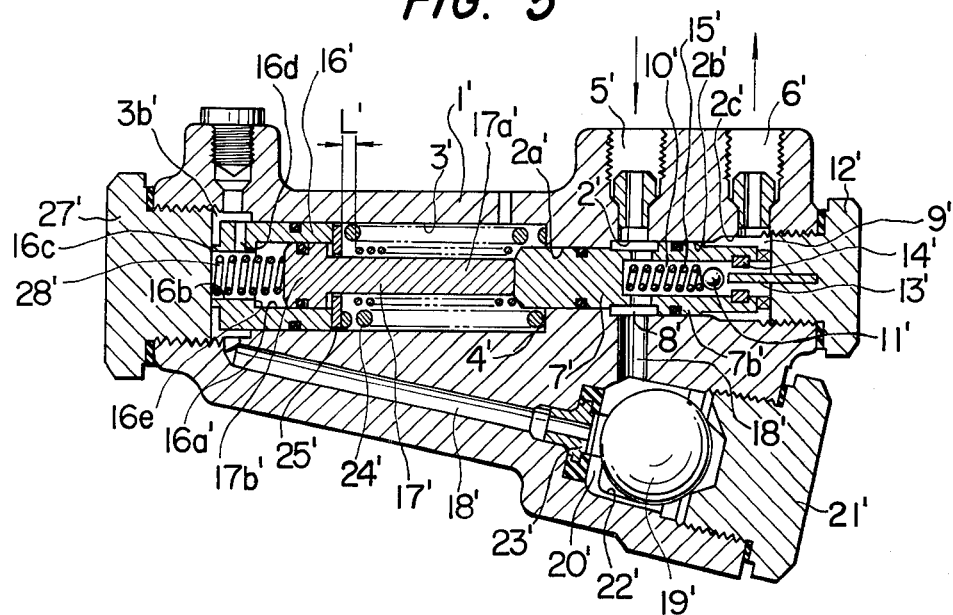
FIG. 5 is a further similar view to FIG. 1, illustrative of the second embodiment of the invention.

In FIG. 5, a second embodiment of the invention is shown substantially in its longitudinal section as in the case of FIG. 1. In this second embodiment, all the reference numerals have been used as seen, by attaching each thereof with a single prime for the corresponding part thereof, irrespective of occasional minor configurational differences.

Still a further difference of the second embodiment from the foregoing first one resides in the following modification of the separating wall means 16' which is formed with an inner large diameter bore portion 16a' kept in sliding engagement with the large diameter portion 17b' of plunger 17', and with an outer small diameter bore portion 16b defined at its extreme outer end by a coaxial circular ring projection 16c for allowing the provision of back-up spring 28' without hindrance. This stepped bore 16a'; 16b is kept in fluid communication through a radial passage bore 16d with the outer space 3b'. The bore portions 16a' and 16b are defined therebetween by a ring shoulder 16e.

Additionally and in common to all the embodiments, the front vehicle wheel cylinders, not shown, are fed with braking pressure liquid directly from the master cylinder, as conventionally.

The general operation of the present embodiment is substantially the same as that of the first embodiment.

However, the operational difference will appear at the rightward or inward shift of the separating wall means 16. When the latter is moved rightwards in FIG. 5 under the influence of increased hydraulic pressure supplied to the chamber 3b', the stroke is limited by the engagement of the outer large diameter portion 17b' of plunger 17' with the ring shoulder 16e on the axial bore wall between 16a' and 16b, so that the driver's pedal depressing stroke is also limited. Thus, a much longer pedal depressing stroke can be effectively avoided. This will also prevent excessive compression of spring means 24'; 26' as may be caused by excessive depression of the brake pedal by the vehicle driver. In the present embodiment, the first spring 24 is inserted in position under proper initial compression. This measure also assists in the above mentioned excessive compression thereof and of the second spring 26.

Figure 6:
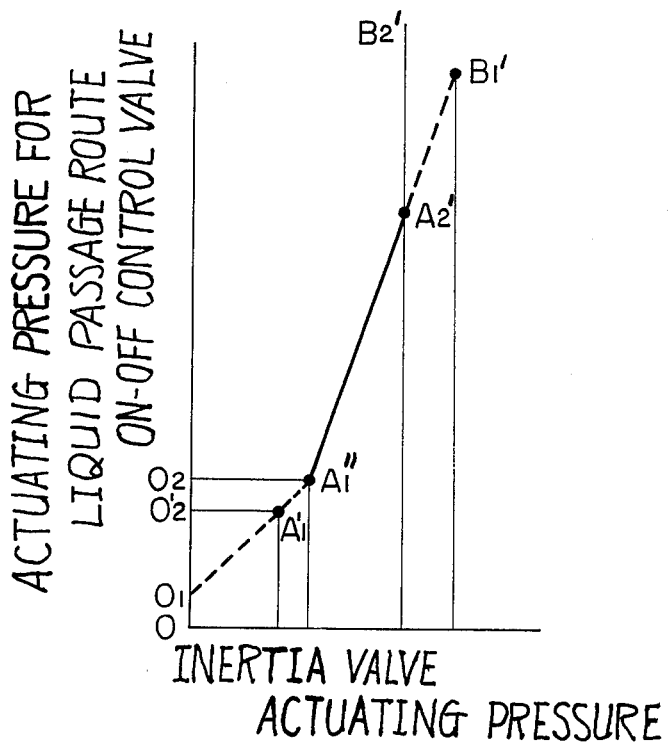
FIG. 6 is a further characteristic chart similar to that shown in FIG. 3, applicable to the second embodiment.

This operational feature will be explained by reference to FIG. 6.

When the first spring is not preloaded, the actuating pressure of the control ball valve 11' will change as denoted at $O_1 - A_1''$. But, preloaded, the change will appear along $O_2 - A_1''$ or $O_2' - A_1'$ as the initial spring load varies.

When the actuating pressure for the inertia valve 19' is within a certain predetermined range $A_1'' - A_2'$, the actuating pressure for control valve 11' will vary generally linearly.

With the aforementioned first embodiment, when the actuating pressure for the inertia valve may rise above $A_2'$, thus along the dotted line $A_2' - B_1'$. However, by the provision of the ring shoulder in the separating wall means 16', the pressure will rise up along $A_2' - B_2'$, thereby excessive compression of said spring means being avoided so as to avoid in turn any possible rear wheel lock.

I claim:

1. A pressure control valve unit for insertion in a brake system extending from a hydraulic pressure source, comprising in combination:

a. a main valve housing having a liquid flow passage formed therein, one end of said flow passage being connected through part of said brake system to said pressure source and the other end of said flow passage being connected to said rear wheel cylinders;
b. a control chamber formed in said main valve housing and being fluidally separated from said flow passage;
c. a piston, one end thereof being fitted with a valve member adapted for on-off control of said fluid passage, one end of said piston being exposed to said liquid flow passage and the other end of said piston being exposed to said control chamber;
d. a tightly movable separating wall fitted in said control chamber;
e. a liquid pressure conveying means adapted for conveying liquid pressure prevailing in said liquid flow passage to one side of said movable separating wall and to said piston end exposed to said liquid flow passage;
f. an inertia valve adapted for interruption of said liquid pressure conveying means upon establishment of a predetermined deceleration of said vehicle;
g. a first spring arranged between said valve housing and said movable separating wall, said spring becoming effective upon movement of said separating wall; and
h. a second spring arranged between said movable separating wall and said piston which becomes effective only after lapse of a predetermined time period upon initiation of the movement of either said separating wall or said piston or both.

2. The control valve unit of claim 1 wherein a plunger is provided which is kept in engagement with said movable separating wall and kept in pressure contact with said other end of said piston.

3. The control valve unit of claim 1 wherein said piston is formed with a hollow central passage serving as said liquid pressure conveying means and said valve member.

4. The control valve unit of claim 1 including means for control of the movable range of said separating wall within said control chamber.

* * * * *